(12) United States Patent
Takikawa et al.

(10) Patent No.: US 7,359,158 B2
(45) Date of Patent: Apr. 15, 2008

(54) SUSPENSION OF DISC DRIVE

(75) Inventors: Kenichi Takikawa, Aiko-gun (JP); Noriyuki Saito, Aiko-gun (JP); Masao Hanya, Aiko-gun (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 438 days.

(21) Appl. No.: 10/856,887

(22) Filed: May 27, 2004

(65) Prior Publication Data

US 2004/0240114 A1 Dec. 2, 2004

(30) Foreign Application Priority Data

Jun. 2, 2003 (JP) ............... 2003-157176

(51) Int. Cl.
G11B 5/48 (2006.01)
G11B 21/16 (2006.01)

(52) U.S. Cl. ............... 360/244.8; 360/244.2; 360/244.3; 360/244.5; 360/245.2; 360/245.8; 360/245.9; 360/294.4; 360/294.6

(58) Field of Classification Search ............. 360/244.2, 360/244.3, 244.5, 244.8, 245.2, 245.8, 245.9, 360/294.4, 294.6
See application file for complete search history.

(56) References Cited

U.S. PATENT DOCUMENTS

| 5,936,803 | A  | * | 8/1999  | Berding ............. 360/244.8 |
| 6,594,115 | B2 |   | 7/2003  | Takagi et al. |
| 6,700,744 | B2 |   | 3/2004  | Nishida et al. |
| 6,731,472 | B2 | * | 5/2004  | Okamoto et al. ........ 360/294.3 |
| 6,765,760 | B2 | * | 7/2004  | Saito et al. ............. 360/244.5 |
| 6,768,613 | B1 |   | 7/2004  | Coon |
| 6,778,362 | B1 | * | 8/2004  | Davis et al. ............. 360/244.8 |
| 2001/0008475 | A1 | * | 7/2001  | Takagi et al. ............ 360/244.8 |
| 2002/0131211 | A1 | * | 9/2002  | Nishida et al. .......... 360/244.2 |
| 2003/0011935 | A1 | * | 1/2003  | Saito et al. ............. 360/244.5 |
| 2003/0107843 | A1 | * | 6/2003  | Hanya et al. ............ 360/244.8 |
| 2003/0161073 | A1 | * | 8/2003  | Horie et al. ............. 360/244.2 |
| 2004/0179303 | A1 | * | 9/2004  | Takikawa et al. ........ 360/245.9 |
| 2004/0240114 | A1 |   | 12/2004 | Takikawa et al. |
| 2005/0030670 | A1 | * | 2/2005  | Ando et al. ............. 360/244.8 |

FOREIGN PATENT DOCUMENTS

| JP | 2001-155458 | A |   | 6/2001 |
| JP | 2002-133813 | A |   | 5/2002 |
| JP | 2002237015  | A | * | 8/2002 |
| JP | 2002-279745 | A |   | 9/2002 |
| JP | 2003-151114 | A |   | 5/2003 |

* cited by examiner

Primary Examiner—William Klinowicz
Assistant Examiner—Carlos E Garcia
(74) Attorney, Agent, or Firm—Frishauf, Holtz, Goodman & Chick, P.C.

(57) ABSTRACT

A suspension for disc drive has a base portion including a base plate, a load beam, a pair of hinge members, a wired flexure, etc. The wired flexure has a metal base and a wiring portion on the metal base. The hinge members are fixed overlapping the rear end portion of the load beam and the front end portion of the base plate. The wired flexure extends through a gap between the hinge members and ranges over the load beam and the base plate.

2 Claims, 5 Drawing Sheets

SUSPENSION OF DISC DRIVE

CROSS-REFERENCE TO RELATED APPLICATIONS

This application is based upon and claims the benefit of priority from prior Japanese Patent Application No. 2003-157176, filed Jun. 2, 2003, the entire contents of which are incorporated herein by reference.

BACKGROUND OF THE INVENTION

1. Field of the Invention

This invention relates to a suspension for a disc drive contained in an information processor, such as a personal computer.

2. Description of the Related Art

A hard disc drive (HDD) for recording and reading information to and from a rotating magnetic disc, magneto-optical disc, etc. has a carriage that can turn around a shaft. A positioning motor turns the carriage around the shaft. The carriage comprises an actuator arm, a suspension on the distal end portion of the arm, a head portion including a slider on the suspension, etc.

If the disc rotates, the slider on the distal end portion of the suspension slightly lifts above the surface of the disc, and an air bearing is formed between the disc and the slider. This suspension comprises a base plate, a load beam, a flexure, etc.

A suspension for disc drive described in Jpn. Pat. Appln. KOKAI Publication No. 2001-155458 comprises a base portion including a base plate, a load beam formed independently of the base portion, and a hinge member that connects the load beam and the base portion. A flexible portion (region between the load beam and the base portion) of the hinge member can bend in its thickness direction. This flexible portion serves as a hinge portion.

In some cases, a wired flexure may be located along the load beam. A magnetic head that includes a slider is mounted on the front end portion of the flexure. The wired flexure extends from the load beam toward the base portion via the hinge portion.

If the wired flexure passes over the hinge member when it is located overlapping the load beam and the base portion, it is inevitably deformed in its thickness direction by a margin corresponding to the thickness of the hinge member. Thus, the wired flexure ceases to be flat. Possibly, therefore, bending stress may develop in the wired flexure and influence the properties of the suspension.

In order to prevent generation of bending stress in the wired flexure, a layout may be proposed such that the flexure detours around the hinge portion. With this arrangement, the wired flexure can be made flat. Since the wired flexure passes on one side of the hinge portion in this case, however, the weight distribution in the region near the hinge portion is asymmetric. This may possibly influence the vibration characteristics of the suspension.

The width of the conventional hinge member is equal to that of the base plate, and the other regions of the hinge member than the flexible portion overlap the load beam and the base portion. If the conventional hinge member is used, therefore, it increases the mass of the suspension. In order to shorten the seek time of a disc drive, the mass of the suspension should be lessened. It is difficult, however, to shorten the seek time if the mass of the suspension increases owing to the use of the conventional hinge member that has a large mass.

BRIEF SUMMARY OF THE INVENTION

Accordingly, the object of this invention is to provide a suspension for disc drive, in which the weights of regions near a hinge portion are well-balanced, and the regions near the hinge portion can be reduced in weight.

A suspension for disc drive according to the invention comprises: a base portion including a base plate; a load beam formed independently of the base portion; a pair of hinge members separate from and independent of each other and fixed overlapping the base portion and the load beam so as to connect the rear end portion of the load beam and the front end portion of the base portion; and a wired flexure located on the respective obverse or reverse surfaces of the base portion and the load beam on which the hinge members are put, extending between the hinge members, and ranging over the load beam and the base portion.

According to this configuration, the weight balance of regions near a hinge portion of the suspension for disc drive is improved, so that the properties can be bettered, and the weight of the hinge portion can be reduced. Thus, the seek time can be shortened. Further, the regions near the hinge portion can be made thinner than in the case where the wired flexure is put on the hinge member, so that they cannot easily interfere with the surrounding members.

Preferably, the wired flexure has a metal base and a wiring portion on the metal base, a part of the metal base being fixed overlapping the base portion. According to this configuration, swing of the flexure can be restrained by fixing a part of it to the base portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

DETAILED DESCRIPTION OF THE INVENTION

A first embodiment of this invention will now be described with reference to FIGS. 1 to 3.

Figure 3:
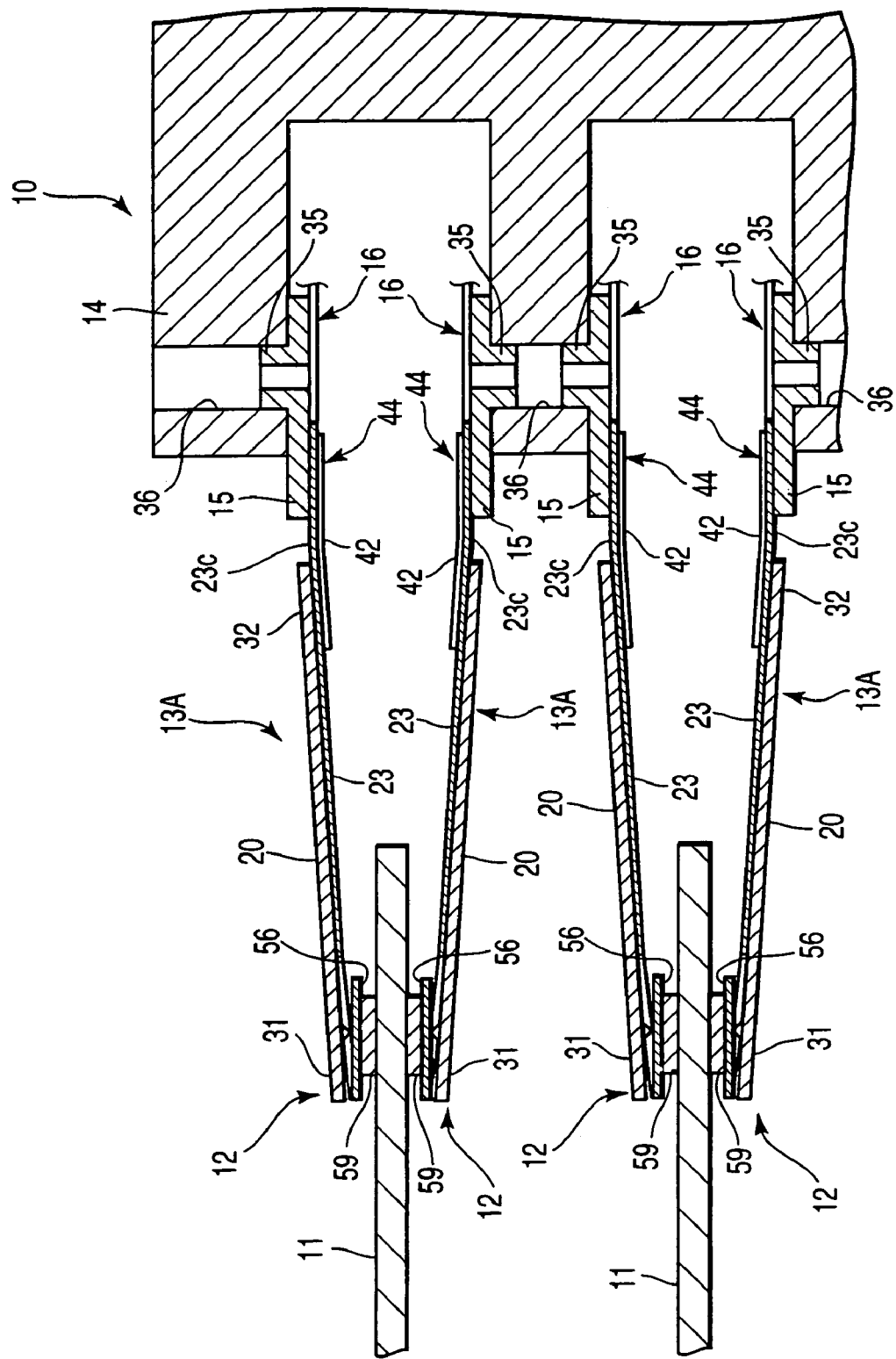
FIG. 3 is a sectional view showing a part of a disc drive provided with the suspension shown in FIG. 1.

A hard disc drive (HDD) 10 shown in FIG. 3 comprises discs 11 for use as recording media, suspensions 13A for disc drive each having a head portion 12, arms (actuator arms) 14 fitted individually with the suspensions 13A, etc.

The head portion 12 is used magnetically to record and read information to and from a recording surface of each disc 11. A positioning motor (not shown) turns the arms 14 around a shaft (not shown).

Figure 1:
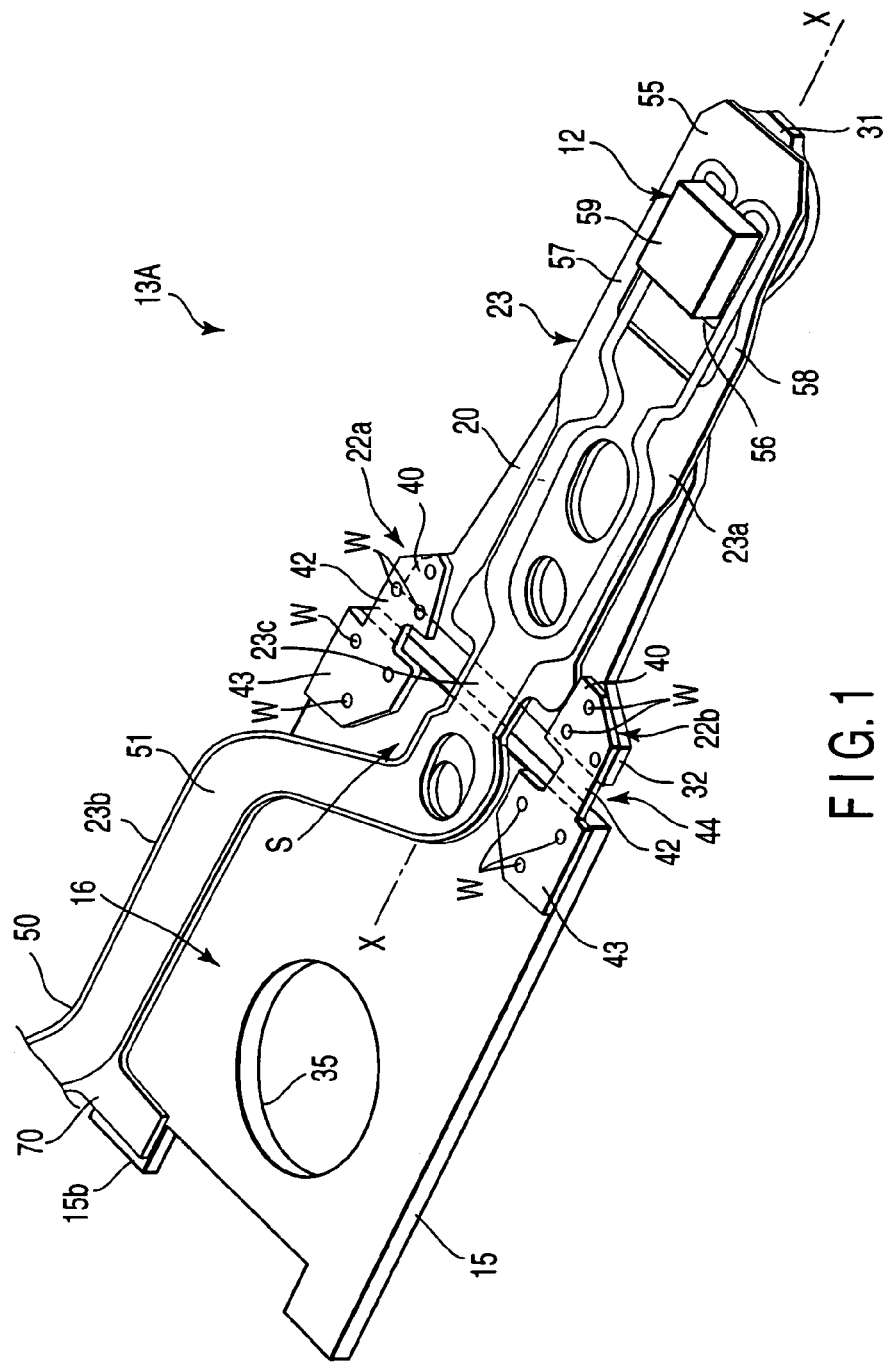
FIG. 1 is a perspective view of a suspension for disc drive according to a first embodiment of the invention.
Figure 2:
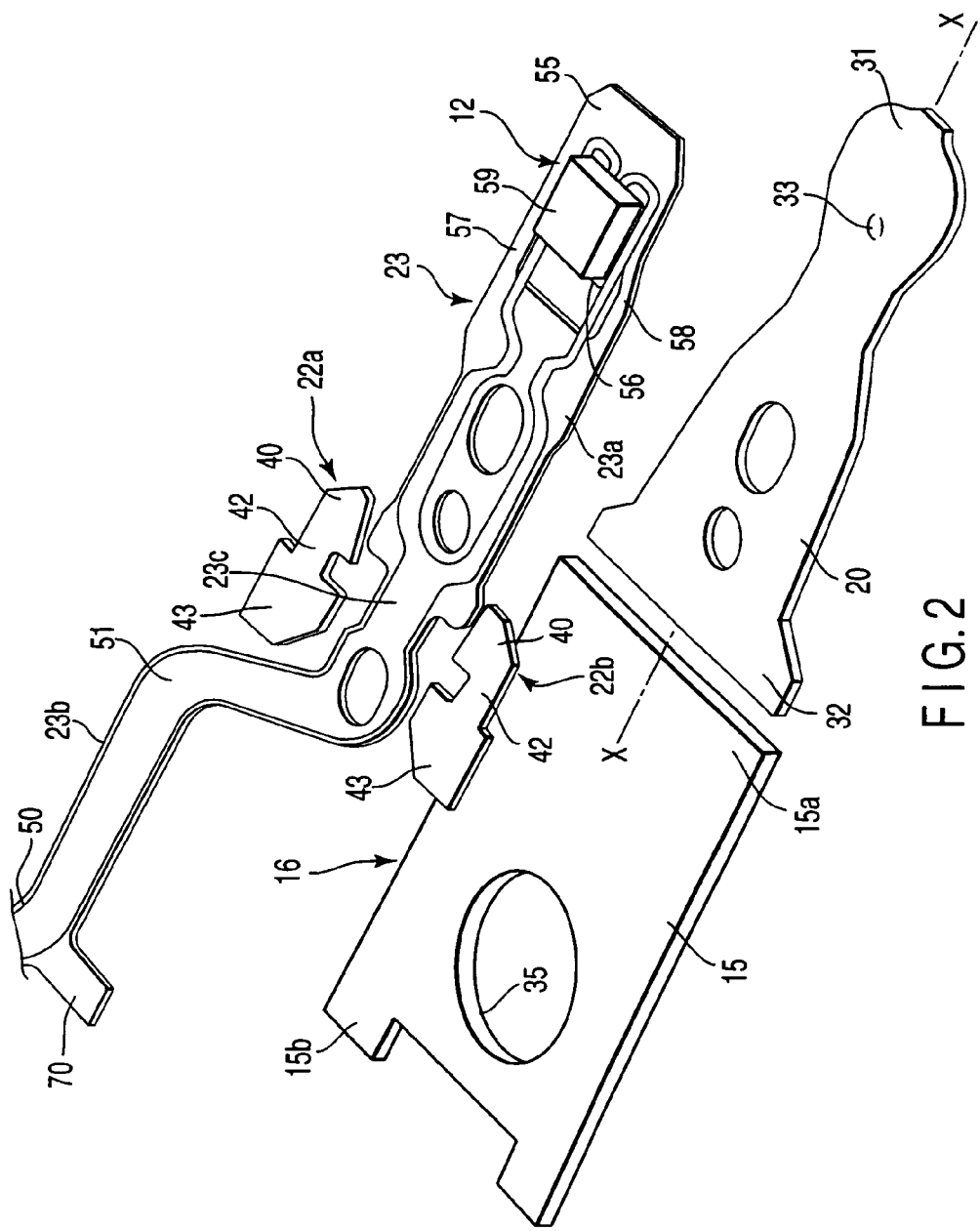
FIG. 2 is an exploded perspective view of the suspension for disc drive shown in FIG. 1.

As shown in FIGS. 1 and 2, each suspension 13A is provided with a base portion 16 having a base plate 15, a load beam 20, a pair of independent hinge members 22a and 22b, a wired flexure 23 attached to the load beam 20. The wired flexure 23 extends along the load beam 20.

The load beam 20 has a front end portion 31 and a rear end portion 32, and is formed with a dimple 33 (shown in FIG. 3) that is located near the front end portion 31 and projects toward the flexure 23. The thickness of the load beam 20 ranges from about 60 to 100 µm, for example. In general, the thickness of the base plate 15 is greater than that of the load beam 20, and ranges from about 150 to 200 µm, for example.

The base plate 15 is formed having a cylindrical boss portion 35. It is fixed to the arm 14 in a manner such that the boss portion 35 is inserted into a mounting hole 36 of each arm 14, as shown in FIG. 3, and caulked (plastically deformed) from inside.

Each of the hinge members 22a and 22b has an end portion 40 fixed overlapping the rear end portion 32 of the load beam 20, a flexible portion 42 situated between the base plate 15 and the load beam 20, and a base mounting portion 43. The mounting portion 43 is fixed overlapping a front end portion 15a of the base plate 15.

The thickness of each of the hinge members 22a and 22b is smaller than that of the load beam 20, and ranges from about 25 to 40 µm, for example. In FIG. 1, symbol W designates each of spot-welded joints that are formed by laser beams or the like. The flexible portions 42 can bend in their thickness direction. The flexible portions 42 form a hinge portion 44 between the base plate 15 and the load beam 20.

The hinge members 22a and 22b are substantially bisymmetric with respect to an axis X that extends in the longitudinal direction of the load beam 20. However, they may be somewhat different in shape. In short, the hinge members 22a and 22b should only be shaped so that left- and right-hand moments of inertia near them are balanced when the load beam 20 is twisted around the axis X.

The wired flexure 23 includes a main portion 23a, which extends along the axis X of the load beam 20, and an extended portion 23b. The extended portion 23b extends along the base plate 15 to the back of the boss portion 35. The flexure 23 is located on those sides, obverse or reverse, of the base plate 15 and the load beam 20 on which the hinge members 22a and 22b are arranged. A middle portion 23c of the flexure 23 with respect to the longitudinal direction extends in the direction of the axis X of the load beam 20 through a gap S between the hinge members 22a and 22b.

The main portion 23a of the wired flexure 23 is fixed to a given part of the load beam 20 by laser welding or adhesive bonding. The extended portion 23b of the flexure 23 extends through the gap S between the hinge members 22a and 22b toward the base plate 15.

The wired flexure 23 has a metal base 50 and a wiring portion 51 formed on the metal base 50. In general, the metal base 50 is thinner than the hinge members 22a and 22b. For example, the metal base 50 is formed of a springy stainless steel sheet having a thickness of about 18 to 25 µm. The wiring portion 51 includes a reading conductor (not shown) and a writing conductor (not shown) that are formed over the metal base 50 with an electrical insulating layer therebetween.

A tongue portion 56 and outrigger portions 57 and 58 are formed near a distal end portion 55 of the wired flexure 23. The tongue portion 56 serves as a movable portion. The outrigger portions 57 and 58 are situated individually on the opposite sides, left and right, of the tongue portion 56. The tongue portion 56 and the outrigger portions 57 and 58 constitute parts of the metal base 50. The tongue portion 56 is designed to engage the dimple 33 (shown in FIG. 2) on the load beam 20. The tongue portion 56 sometimes can freely tilt around the dimple 33 if the outrigger portions 57 and 58 bend in the thickness direction of the flexure 23, for example.

A slider 59 that constitutes the head portion is mounted on the tongue portion 56. The slider 59 is provided with a transducer (not shown) for use as a magneto-electric device. The transducer, slider 59, etc. constitute the head portion 12.

A supported portion 70 is formed on a part of the extended portion 23b of the wired flexure 23 with respect to the longitudinal direction. The supported portion 70 is formed by extending a part of the metal base 50 of the flexure 23 sideways. The supported portion 70 is put on a rear end portion 15b of the base plate 15 that is situated behind the boss portion 35. It is fixed to the rear end portion 15b of the base plate 15 by fixing means such as laser welding.

In this suspension 13A, the middle portion 23c of the wired flexure 23 with respect to the longitudinal direction extends through the gap S between the hinge members 22a and 22b. Therefore, the shape of a region near the hinge portion 44 is substantially bisymmetric with respect to the axis X. If the load beam 20 bends in the thickness direction, therefore, the load beam 20 and the base plate 15 cannot be easily induced to twist.

Further, the hinge members 22a and 22b are separate from and independent of each other, and the gap S is formed between them. The very small hinge members 22a and 22b exist only on a part of the base portion 16 with respect to its width direction. Therefore, the mass of the hinge portion 44 can be made smaller than that of a conventional hinge member that is as wide as a base portion. If the mass of the hinge portion 44 is small, the seek time of the disc drive 10 can be shortened favorably.

Figure 4:
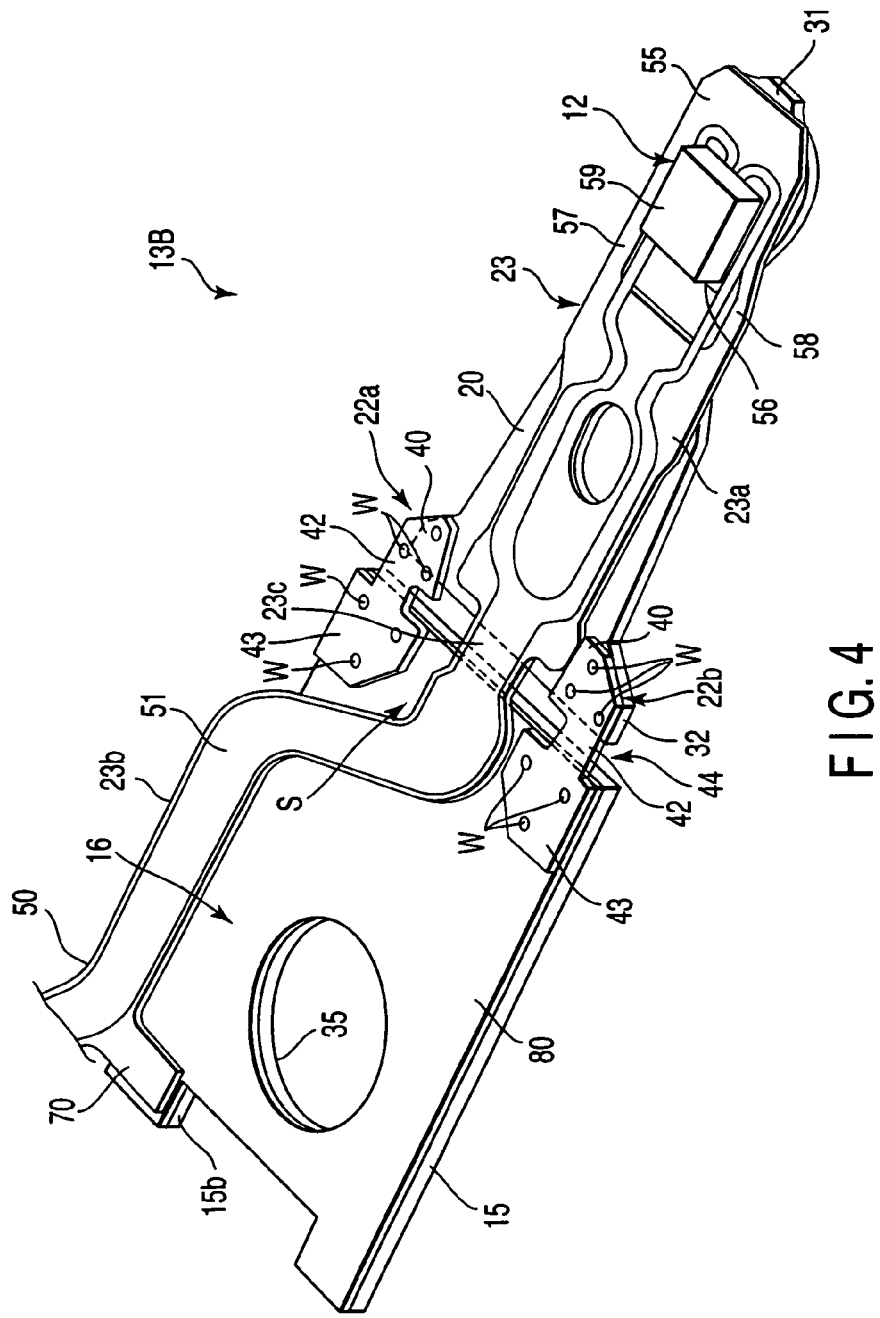
FIG. 4 is a perspective view of a suspension for disc drive according to a second embodiment of invention.
Figure 5:
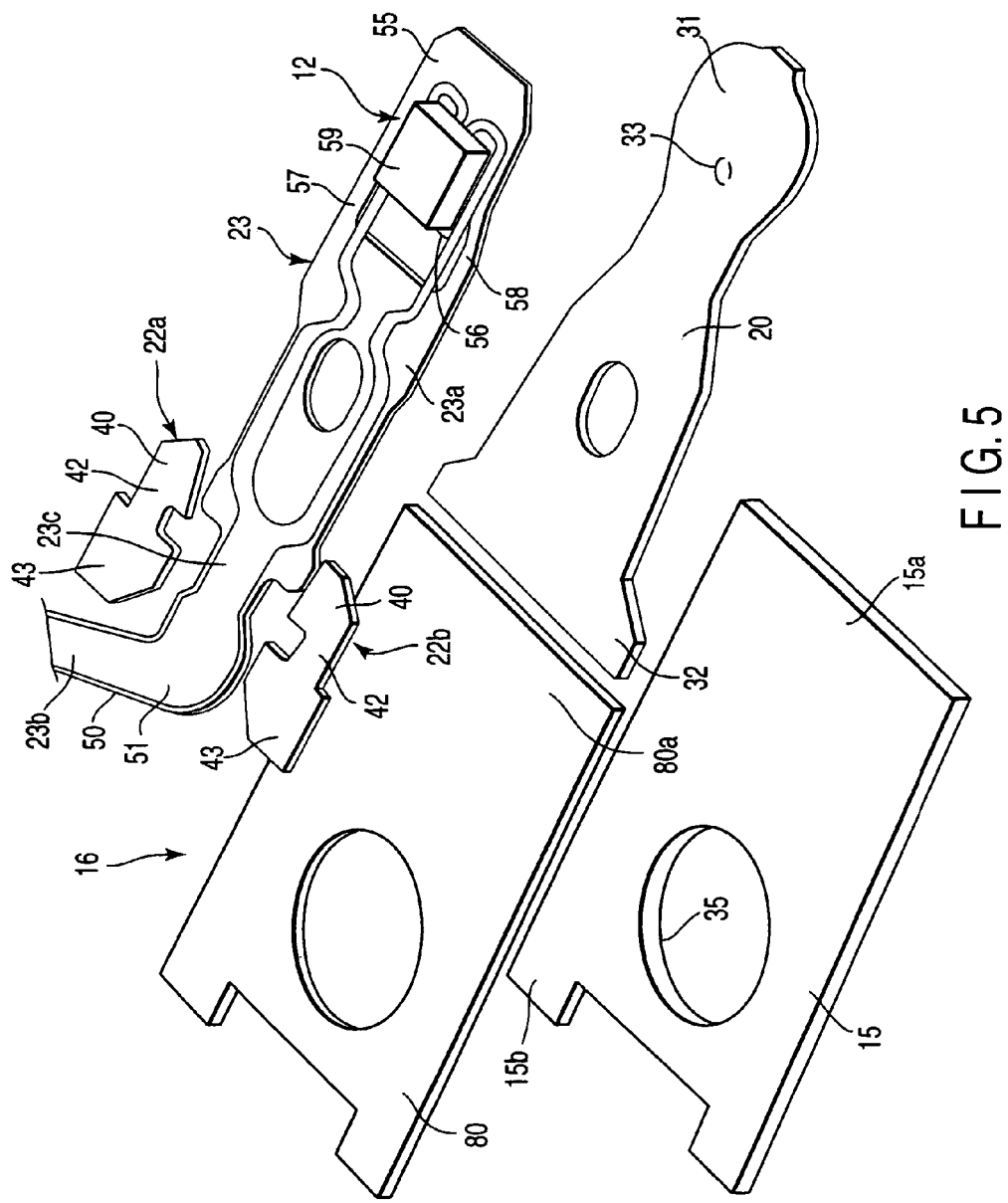
FIG. 5 is an exploded perspective view of the suspension for disc drive shown in FIG. 4.

FIGS. 4 and 5 show a suspension 13B for disc drive according to a second embodiment of the invention. A base portion 16 of the suspension 13B is composed of a base plate 15 and a plate member 80. The plate member 80 is as thick as a load beam 20 and is formed of the same material as the load beam 20. The plate member 80 is fixed overlapping the base plate 15 in its thickness direction. Respective base mounting portions 43 of hinge members 22a and 22b are fixed overlapping a front end portion 80a of the plate member 80.

The suspension 13B shares other configurations and functions with the suspension 13A of the first embodiment. Therefore, like numerals are used to designate common portions of the suspension 13A and 13B, and a description of those portions is omitted.

It is to be understood, in carrying out this invention based on the embodiments described above, that the components of the invention, including the respective configurations of the base portion, load beam, wired flexure, hinge members, etc, may be variously changed or modified without departing from the scope or spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A suspension for a disc drive, comprising:
   a base portion including a base plate and having a pair of side edges, front and rear end portions and obverse and reverse surfaces;
   a load beam formed independently of the base portion and having front and rear end portions and obverse and reverse surfaces;
   a pair of hinge members formed independently of the base portion and the load beam, and including a front end fixed to the rear end portion of the load beam, and a rear end fixed to the front end portion of the base portion, said hinge members being separate from and independent of each other and being fixed overlapping one of the obverse and reverse surfaces of the base portion and the load beam so as to connect the rear end portion of the load beam and the front end portion of the base portion; and
   a wired flexure which comprises a metal base and a wiring portion formed on the metal base, and which is provided on and contacts with the one of the obverse and reverse surfaces of the base portion and the load beam on which the hinge members are fixed, said wired flexure extending between the pair of hinge members, and extending over the load beam and the base portion,
   wherein a thickness of the metal base of the wired flexure is thinner than a thickness of the hinge members;
   wherein each of the hinge members has a length which is less than a length of the base portion, and the hinge members have a total width which is less than a width of the base portion; and
   wherein the wired flexure includes an extended portion that extends along the rear end of one of the hinge members toward one of the side edges of the base portion, and the extended portion overlaps the base portion at a position which is rearward away from the rear end of one of the hinge members.

2. The suspension according to claim 1, wherein a part of the metal base is fixed overlapping the base portion.

* * * * *